United States Patent [19]
Langley, Sr. et al.

[11] Patent Number: 5,269,125
[45] Date of Patent: Dec. 14, 1993

[54] TRIMMING MOWER APPARATUS

[76] Inventors: Donald G. Langley, Sr.; Kevin L. Langley, both of 157 Factory Rd., Hampstead, N.C. 28443

[21] Appl. No.: 881,165

[22] Filed: May 11, 1992

[51] Int. Cl.[5] .......................................... A01D 34/82
[52] U.S. Cl. .................................. 56/17.4; 56/320.2; 56/DIG. 20
[58] Field of Search .............. 56/17.4, 320.1, 320.2, 56/DIG. 18, DIG. 20, DIG. 24

[56] References Cited

U.S. PATENT DOCUMENTS 4,854,115 8/1989 Jones et al. ..................... 56/320.1
4,962,635 10/1990 Jones et al. ..................... 56/17.4 X

FOREIGN PATENT DOCUMENTS 226921 9/1958 Australia ........................ 56/17.4
221987 1/1959 Australia ........................ 56/320.2
724687 11/1966 Italy ............................... 56/17.4

*Primary Examiner*—Terry Lee Melius
*Attorney, Agent, or Firm*—Leon Gilden

[57] ABSTRACT

A trimming mower includes a mower deck having a first side and second side, with second side wheels recessed within the second side and the mower deck. The first side includes an exhaust chute, wherein the second side includes an auxiliary housing hingedly mounted to the mower deck to permit projection of the rotary blade from the mower deck to effect a trimming operation relative to a lawn being mowed.

3 Claims, 4 Drawing Sheets

TRIMMING MOWER APPARATUS

BACKGROUND OF THE INVENTION

1. Field of the Invention

The field of invention relates to lawn mower apparatus, and more particularly pertains to a new and improved trimming mower apparatus wherein the same is arranged to permit selective access of a rotary mower blade of a lawn mower housing to effect a trimming procedure of a lawn.

2. Description of the Prior Art

Lawn mower trimming devices of various types have been utilized in the prior art to permit trimming about a periphery of a lawn in association with a lawn mower. Prior art structure is exemplified in the U.S. Pat. Nos. 4,949,536; 4,642,976; 4,170,099; 4,823,542; and 4,282,704.

The instant invention attempts to overcome deficiencies of the prior art by providing for a lawn mower deck permitting access of the lawn mower blade relative to a lawn to effect a trimming procedure thereof.

SUMMARY OF THE INVENTION

In view of the foregoing disadvantages inherent in the known types of lawn mower apparatus now present in the prior art, the present invention provides a trimming mower apparatus wherein the same includes a pivotal housing segment of a lawn mower deck directing access of the lawn mower blade relative to trimming of a lawn adjacent walls and the like heretofore not accessible due to orientation of second side wheels on the mower deck of conventional lawn mower structure. As such, the general purpose of the present invention, which will be described subsequently in greater detail, is to provide a new and improved trimming mower apparatus which has all the advantages of the prior art lawn mower apparatus and none of the disadvantages.

To attain this, the present invention provides a trimming mower including a mower deck having a first side and second side, with second side wheels recessed within the second side and the mower deck. The first side includes an exhaust chute, wherein the second side includes an auxiliary housing hingedly mounted to the mower deck to permit projection of the rotary blade from the mower deck to effect a trimming operation relative to a lawn being mowed.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved trimming mower apparatus which has all the advantages of the prior art lawn mower apparatus and none of the disadvantages.

It is another object of the present invention to provide a new and improved trimming mower apparatus which may be easily and efficiently manufactured and marketed.

It is a further object of the present invention to provide a new and improved trimming mower apparatus which is of a durable and reliable construction.

An even further object of the present invention is to provide a new and improved trimming mower apparatus which is susceptible of a low cost of manufacture with regard to both materials and labor, and which accordingly is then susceptible of low prices of sale to the consuming public, thereby making such trimming mower apparatus economically available to the buying public.

Still yet another object of the present invention is to provide a new and improved trimming mower apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
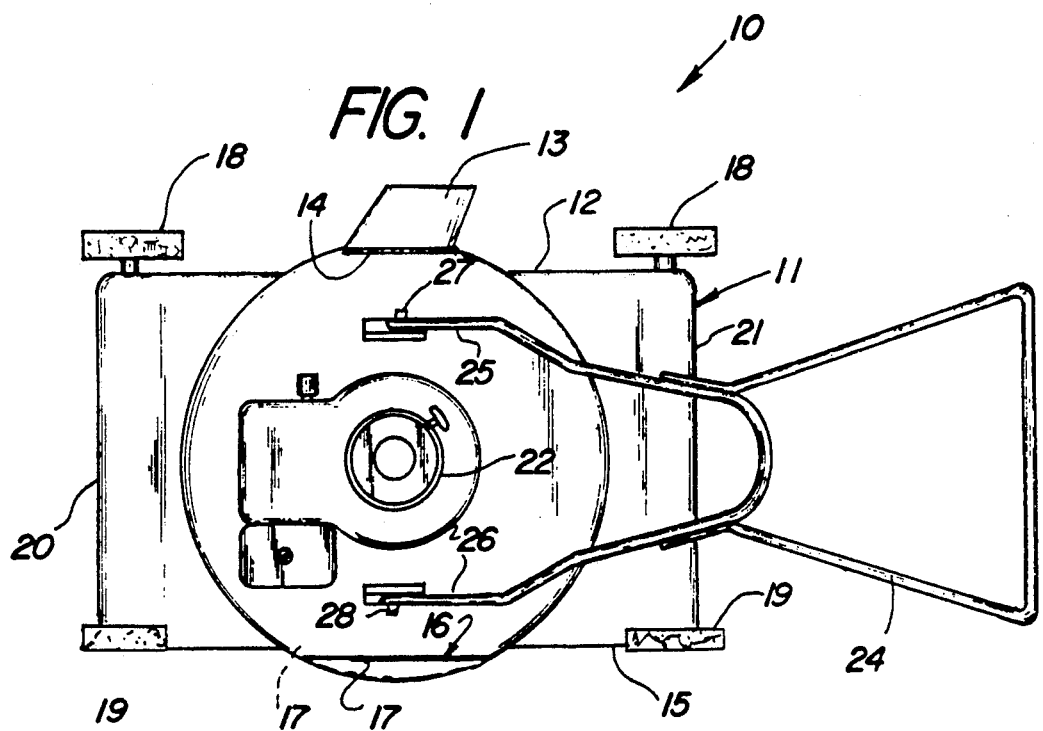
FIG. 1 is a top view of the instant invention.
Figure 2:
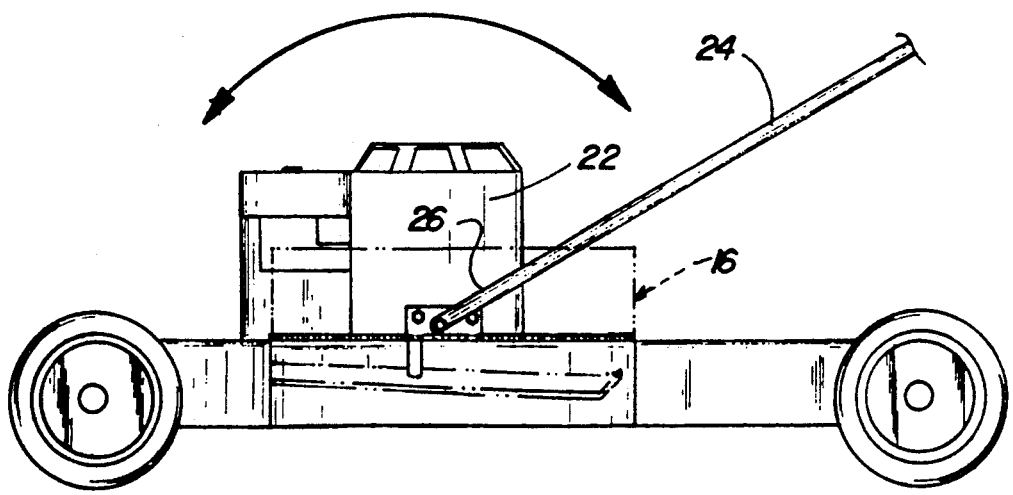
FIG. 2 is an orthographic side view of the invention.
Figure 3:
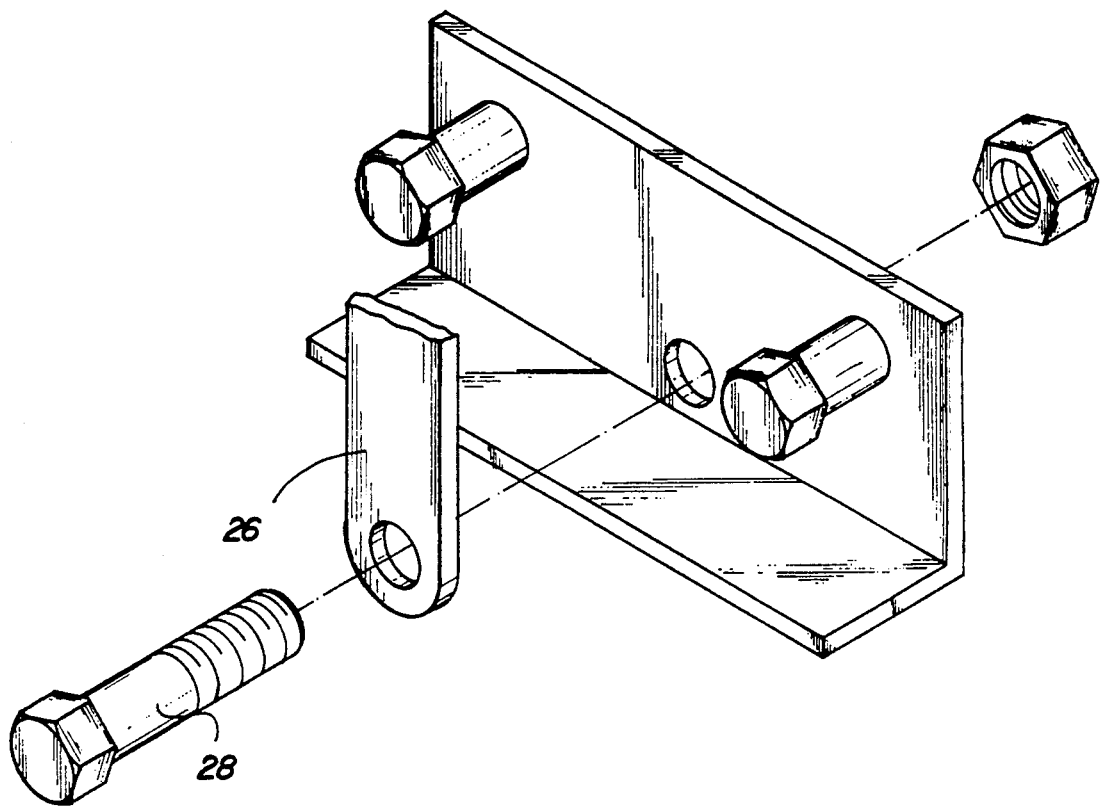
FIG. 3 is an isometric illustration of a bracket structure utilized by the invention for mounting the lawn mower handle to the lawn mower deck in a pivotal relationship.

With reference now to the drawings, and in particular to FIGS. 1 to 9 thereof, a new and improved trimming mower apparatus embodying the principles and concepts of the present invention and generally designated by the reference numeral 10 will be described.

More specifically, the trimming mower apparatus 10 of the instant invention essentially comprises a lawn mower deck 11 having a first side 12 spaced from and parallel a second side 15. The first side includes an exhaust chute 13 hingedly mounted about the first side 12 about an exhaust chute hinge 14 that is coplanar with the first side 12 substantially medially of the first side. The second side 15 includes a second side cover housing 16 positioned medially of the second side 15 hingedly mounted about a cover housing hinge 17 that is substantially parallel relative to the second side 15 and may be parallel thereto, in a manner as illustrated in phantom in FIG. 1.

Figure 4:
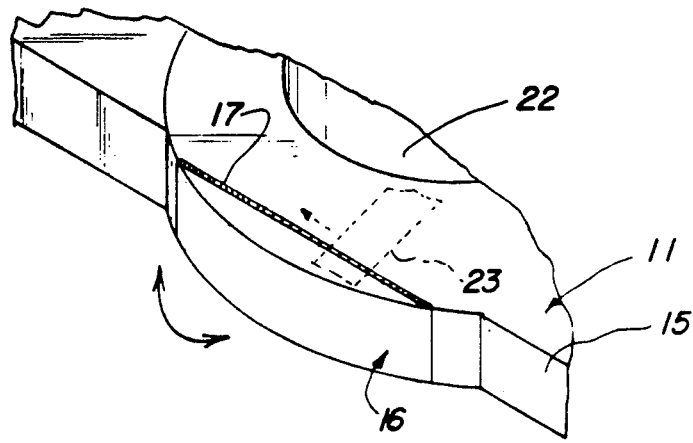
FIG. 4 is an isometric illustration, somewhat enlarged, of the second side cover housing pivotally mounted relative to the lawn mower deck.

First side wheels 18 project orthogonally relative to the first side 12 beyond the first side, wherein second side wheels 19 are positioned within the lawn mower deck between the first side 12 and the second side 15. In this manner, pivotment of the second side cover housing 16 about the cover housing hinge 17 permits projection of the lawn mower blade 23 exteriorly of the second side 15 for trimming adjacent vertical wall surfaces and the like. The cover housing hinge 17 is typically of a spring hinge construction to bias the cover housing 16 in the covered orientation, in a manner as illustrated in FIG. 1 and FIG. 4. A lawn mower drive motor 22 is positioned to a top surface of the lawn mower deck in a conventional manner, as illustrated, to effect rotation of the lawn mower blade 23. A handle 24 of a generally U-shaped configuration includes a first leg 25 adjacent a first side 12 and a second leg 26 adjacent a second side 15 rotatable substantially one hundred eighty degrees relative to a respective first and second pivot axle 27 and 28 that are orthogonally oriented relative to the first and second sides 12 and 15. The first and second pivot axle 27 and 28 are coaxially aligned relative to one another and positioned on opposed sides of the lawn mower drive motor 22 to permit manual manipulation of the lawn mower relative to the first end 20 or the second end 21 of the deck structure 11.

Figure 5:
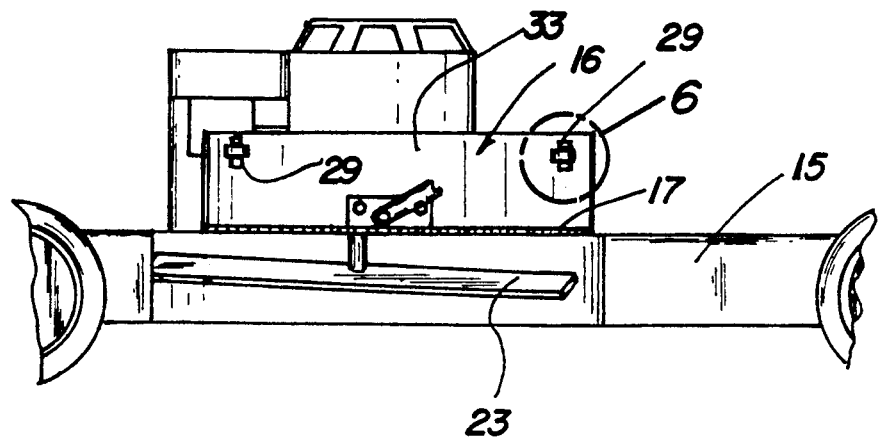
FIG. 5 is an orthographic side view of the lawn mower, partially in section, illustrating the orientation of the lawn mower blade therewithin.
Figure 6:
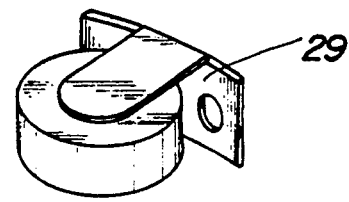
FIG. 6 is an enlarged isometric illustration of section 6 as set forth in FIG. 5.
Figure 7:
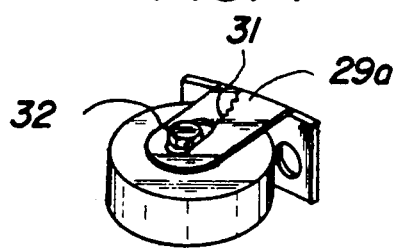
FIG. 7 is an isometric illustration of a modified lawn mower wheel structure of a type as set forth in FIG. 6.

The cover housing 16, as illustrated in FIG. 5, is optionally formed with a plurality of wheel members 29 mounted to a cover housing interior wall surface 33, whereupon abutment of the cover housing adjacent a vertical wall surface and the like permits rotation of the wheel members 29 along the vertical wall surface minimizing damage to the cover housing. In this vein, a modified wheel member 29 or plurality thereof may be utilized, in a manner as illustrated in FIG. 7, having a wheel member spring 31 imposed upon a wheel member axle 32 mounting the associated wheel structure to accommodate shock and impact to the wheel structure 29a upon abutment of a wall surface.

Figure 8:
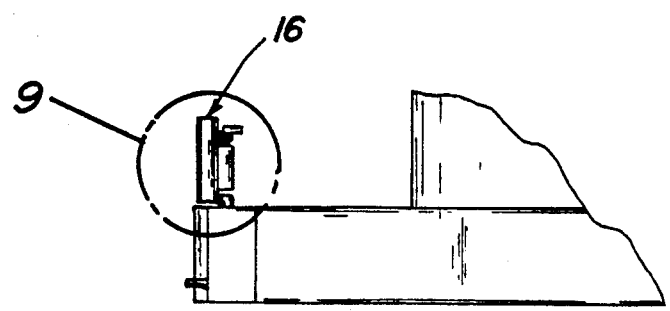
FIG. 8 is an orthographic side view of a latch structure utilized with the second side cover housing.
Figure 9:
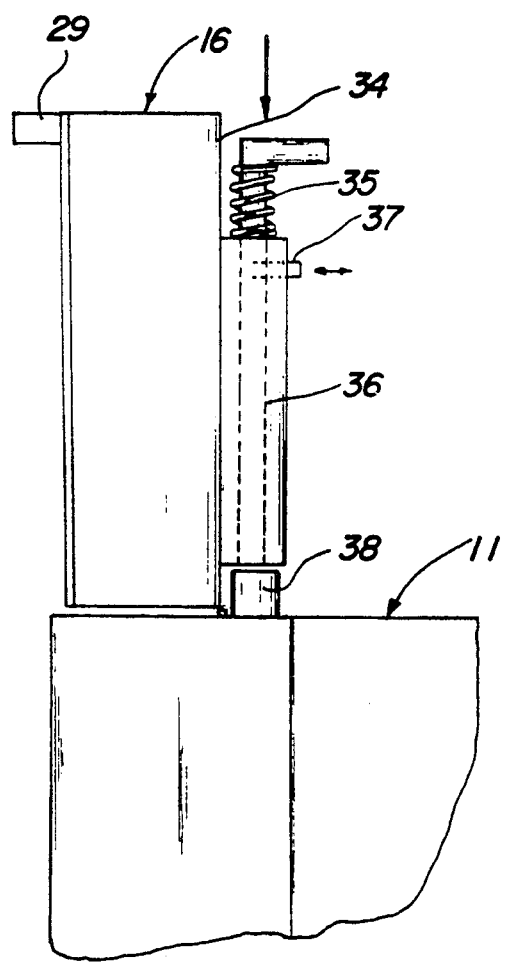
FIG. 9 is an orthographic view of section 9, somewhat enlarged, illustrating the detail thereof.

The FIGS. 8 and 9 illustrate the use of the cover housing 16 having an outer wall surface 34 mounting a lock bar 35 orthogonally to a top surface of the lawn mower deck 11, wherein the lock bore 35 is reciprocatably mounted within a lock tube 36. A latch 37 orthogonally oriented relative to the lock bar 35 is slidably mounted through the tube 36 for selective engagement with the lock bar 35 to bias the lock bar 35 in a lowered orientation when received within a bar socket 38. In this manner, the latch 37 is received within an aperture within the lock bar 35 and upon displacement of the tube latch 37 relative to the tube 36, the lock bar 35 is biased upwardly relative to a spring mounted interposed between the lock bar upper distal end and an upper distal end of the tube 36 to maintain the housing 16 in a raised orientation, as illustrated in FIG. 9.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A trimming mower apparatus, comprising,
   a lawn mower having a lawn mower deck, the lawn mower deck including a first side spaced from and parallel a second side, and
   a first end spaced from and parallel a second end, a lawn mower drive motor mounted to a top surface of the lawn mower deck, and
   a lawn blade in operative communication with the lawn mower drive motor arranged for rotation in cooperation with the lawn mower drive motor, and
   a first side exhaust chute is mounted relative to the first side projecting beyond the first side, and
   the second side includes a second side cover housing, the second side cover housing includes a cover housing hinge, wherein the cover housing hinge is arranged in a parallel relationship relative to the second side, and
   the cover housing hinge is a spring hinge, and the hinge is coplanar with the second side, and
   the first side includes first side wheels extending beyond the first side, the second side includes second side wheels positioned between the first side and the second side within the lawn mower deck, and a lawn mower handle, including a handle first leg and a handle second leg, wherein the handle first leg is pivotally mounted relative to the lawn mower deck about a first pivot axle, the handle second leg is pivotally mounted relative to the lawn mower deck about a second pivot axle, wherein the first pivot axle and the second pivot axle are coaxially aligned and are orthogonally oriented relative to the first side and the second side, and arranged for rotation one hundred eighty degrees relative to the lawn mower deck selectively beyond the first end and the second end of the lawn mower deck, and the lawn mower blade extends beyond the second side and within the cover housing, and the cover housing hinge is a spring hinge, and a plurality of wheel members, the wheel members each include a wheel member axle, each wheel member axle is orthogonally oriented relative to the cover housing hinge, and the wheel members are mounted to an interior surface of the cover housing and project beyond the cover housing when the cover housing is in a raised orientation relative to the lawn mower deck in a second position from a first position when the cover housing is positioned below the lawn mower deck.

2. An apparatus as set forth in claim 1 wherein the cover housing includes a cover housing outer wall surface, and a lock bar, and a lock bar tube, the lock bar is reciprocatably mounted within the lock bar tube, the lock bar tube is fixedly mounted to the cover housing outer wall surface, and the lock bar tube is orthogonally oriented relative to the cover housing hinge, and a lock bar socket is mounted to the lawn mower deck top surface and is arranged for reception of the lock bar tube when the cover housing is in a second position.

3. An apparatus as set forth in claim 2 including a tube latch slidably mounted to the lock bar tube for selective engagement with the lock bar to maintain the lock bar within the lock bar socket when the cover housing is in the second position.

* * * * *